Aug. 26, 1969     B. STRAUSS     3,464,044

MAGNETIC TRANSDUCER ASSEMBLY

Filed July 17, 1967

INVENTOR.
BRUNO STRAUSS

BY Christensen, Sanborn, & Matthews

ATTORNEYS 3,464,044
MAGNETIC TRANSDUCER ASSEMBLY
Bruno Strauss, Seattle, Wash., assignor to Electro Development Corporation, Seattle, Wash., a corporation of Washington
Filed July 17, 1967, Ser. No. 653,692
Int. Cl. H01f 27/02
U.S. Cl. 336—92   2 Claims

ABSTRACT OF THE DISCLOSURE

An improved transducer assembly including a section made of titanium is disclosed. The titanium acts as a "window" for the magnetic field and is adapted to hold a sensing assembly responsive to changes in a magnetic field passing through the titanium. The apparatus serves to protect the electronic sensing apparatus to an extent which permits extended usage of magnetic field sensing devices under conditions of extremely high pressure differentials.

---

In many applications it is necessary to sense a given condition within a high pressure fluid, such as for example in the hydraulic art. In some application the use of proximity switches operating on the basis of a variable reactance sensing unit provide the only effective means of controlling an external circuit in response to a control function under adverse conditions. In the high pressure hydraulic arts it is found that the extreme pressures not only prevent the use of conventional mechanical switches but can cause problems by forcing the fluid through the materials heretofore used for the housing for the sensing unit. It would thus be advantageous to have a housing assembly adapted for location in the wall of a hydraulic unit with the housing being substantially transparent to a magnetic field and yet offering a high degree of mechanical strength and also being substantially impervious to corrosive and high pressure fluids.

It is thus an object of the present invention to provide a high-strength transducer mounting apparatus which is substantially transparent to magnetic fields. A further object of the present invention is to provide a combination variable reactance sensing unit and associated housing adapted for removable insertion in the wall of a pressurized container with the housing acting as a substantially transparent magnetic window and providing a high degree of protection for the electrical components.

Another object of the present invention is to provide a titanium housing assembly for holding a variable reactance proximity sensing switch assembly in the wall of a container filled with pressurized or corrosive liquids or gases.

In accordance with the teachings of the present invention, a titanium case is provided for a magnetic sensing unit. The arrangment is such that the high resistivity and low permeability of the titanium results in a "window" being provided which is substantially transparent to magnetic fields. Thus accurate sensing by the electrical equipment can be achieved with the sensing unit being protected against the effects of a high pressure or corrosive fluid. In one specific embodiment the titanium housing is in the form of a hollow bolt adapted to be threaded into the wall of a fluid containing member with the end of the hollow bolt then acting as the interface between the corrosive or high-pressure material in the container and the electronic sensing apparatus positioned in the hollow bolt. The sensing apparatus can be of the type shown in the copending application of Strauss and Banks, Ser. No. 604,284, filed on Dec. 23, 1966. In one embodiment the bolt is provided with external and internal threads with the arrangement being such that the external threads mate with the threads of an opening in the fluid container and the internal threads are adapted to receive the threads of a magnetic sensor.

The above and additional objects of the invention will be more clearly understood from the following description when read with reference to the accompanying drawings wherein.

Figure 1:
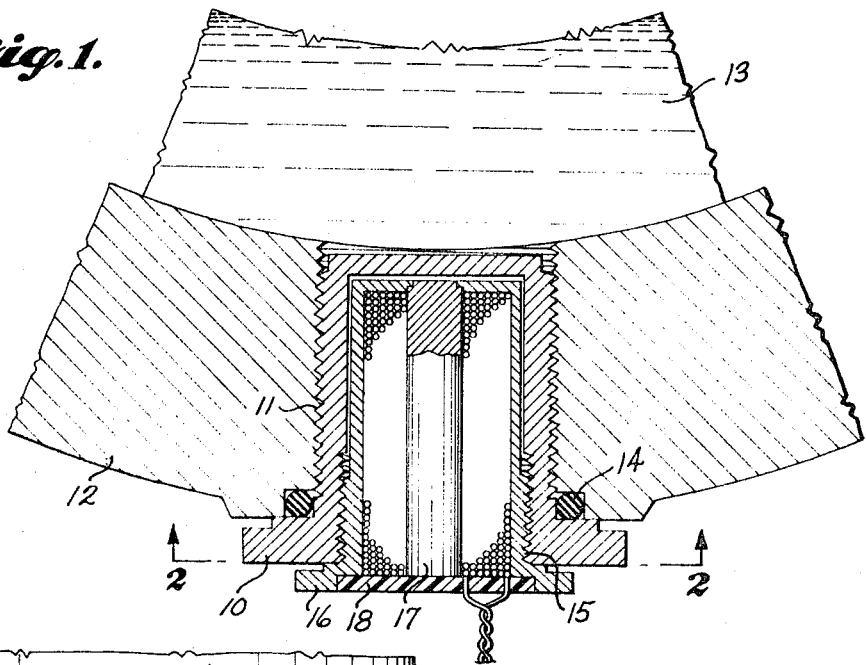
FIGURE 1 is a cross sectional view showing the construction details of one preferred embodiment of the housing assembly having a magnetic sensing unit therein.

Turning now to the drawings and in particular to FIGURE 1 the preferred embodiment of the invention will be seen to include a titanium bolt or housing member 10 having external threads 11 adapted for mating connecting with the threaded opening in the wall 12 of a fluid cylinder containing a highly pressurized and/or corrosive fluid 13. The housing member 10 is held in a sealed engagement with the cylinder 12 by means of the O-ring or gasket 14.

While the titanium housing assembly 10 can take on various shapes and forms, it will be seen in FIGURE 1 that the housing 10 is also provided with interior threads 15 near the outer end thereof so that the magnetic sensing unit 16 can be threaded into the housing 10. As explained in greater detail in the copending application of Strauss and Banks referred to above, the proximity sensing unit may include a central core member 17 and appropriate windings 18 thereon. As explained in said application, when a target member inside the cylinder 12 is moved toward or away from the core 17 the change in reluctance caused thereby in a Maxwell type bridge circuit causes an electronic switch to open or close. Since the housing 10 has little or no effect on the magnetic fields necessary for operation of the sensing unit, it will be seen that an advantageous mounting assembly is provided.

Figure 2:
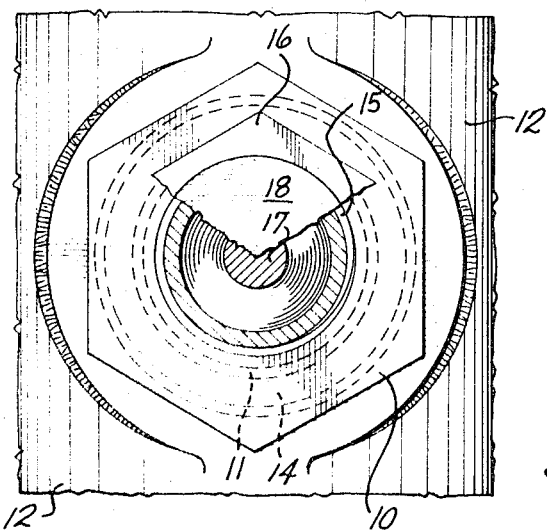
FIGURE 2 is an end elevation of the apparatus in FIGURE 1.

It will be seen in FIGURES 1 and 2 that the outer end of the housing member 10 is in the form of a hexagonal nut to permit tightening of the titanium housing into the cylinder 12.

Figure 3:
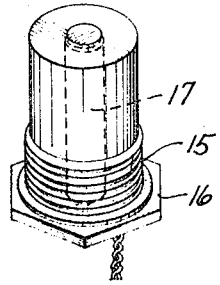
FIGURE 3 is a perspective view of the completed assembly illustrated in FIGURE 1 and adapted for insertion in the wall of a high-pressure tank or hydraulic cylinder.
Figure 4:
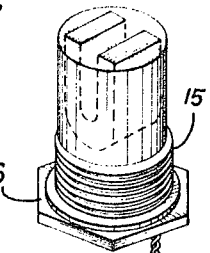
FIGURE 4 is a perspective view similar to FIGURE 3 but showing the manner in which a different type of sensing unit is located within the titanium housing.

The embodiment of FIGURE 4 is substantially the same as that in FIGURES 1–3 with the exception that a U-shaped core and coil assembly more similar to that in the above identified copending application is used as the sensing unit.

It has been discovered that the titanium housing not only provides extremely high mechanical strength and high corrosion resistance, but also has been found to be magnetically transparent to signals of a frequency from zero (D.C.) as well as up into the audio frequency range. Thus the housing assembly serves extremely well for positioning the sensitive portion of a magnetic field sensing unit adjacent an adverse environment such as is typically encountered in connection with pressurized containers having high pressure and/or corrosive gases and fluids therein.

While the invention has been disclosed by reference to the presently preferred embodiments, it is obvious that other arrangements and changes will become obvious to a person skilled in the art as a result of the teachings hereof. It is intended that such modifications and changes will be encompassed by the following claims.

What is claimed is:

1. A variable reactance proximity sensing apparatus comprising in combination: a titanium housing member having an end wall, side walls integrally formed with said end wall, and means defining threads on said side walls, said member having an open central region adjacent said end wall; and a magnetic field generating sensing unit secured to the interior of said member and oriented with its magnetic axis substantially perpendicular to said end wall, whereby the magnetic field of said unit passes through said end wall and the magnetic circuit of said unit is protected against and physically isolated from adverse environments adjacent the opposite side of said end wall.

2. Apparatus as defined in claim 1 wherein said member comprises a hollow titanium bolt having external and internal threads, and wherein said unit is threaded into said member.

References Cited

UNITED STATES PATENTS

| | | | |
|---|---|---|---|
| 2,399,295 | 4/1946 | Ray | 336—90 XR |
| 2,429,920 | 10/1947 | Bourne | 335—305 XR |
| 2,435,043 | 1/1948 | Lehde et al. | 324—40 XR |
| 2,698,090 | 12/1954 | Chievitz | 335—305 |
| 3,227,973 | 1/1966 | Gray | 336—90 XR |
| 3,280,775 | 10/1966 | Krenzke | 220—83 XR |

LEWIS H. MYERS, Primary Examiner

T. J. KOZMA, Assistant Examiner

U.S. Cl. X.R.

324—34; 335—305; 340—8